United States Patent [19]

Wilhite

[11] Patent Number: 5,319,911
[45] Date of Patent: Jun. 14, 1994

[54] NUT HARVESTER

[76] Inventor: Russell J. Wilhite, 2218 Fourth St., Wasco, Calif. 93280

[21] Appl. No.: 889,135

[22] Filed: May 26, 1992

[51] Int. Cl.⁵ ............................................. A01D 46/00
[52] U.S. Cl. .................................. 56/328.1; 56/12.8; 56/13.3; 56/DIG.8
[58] Field of Search .................. 56/12.8, 13.3, 16.7, 56/328.1, DIG.8

[56] References Cited

U.S. PATENT DOCUMENTS

| | | |
|---|---|---|
| 1,807,751 | 6/1931 | Post . |
| 2,499,037 | 2/1950 | Roles . |
| 2,502,810 | 4/1950 | Waters . |
| 2,653,438 | 9/1953 | Ramirez ................... 56/32 |
| 2,682,742 | 7/1954 | Hiatt ...................... 56/328.1 |
| 2,789,408 | 4/1957 | Kelley . |
| 2,870,594 | 1/1959 | Larsh .................... 56/328.1 X |
| 3,555,790 | 1/1971 | Quick ..................... 56/12.8 |
| 3,568,422 | 3/1971 | Thies . |
| 3,579,969 | 5/1971 | Richter, Jr. ............. 56/328.1 |
| 3,733,797 | 5/1973 | Kelly ..................... 56/328.1 |
| 3,808,785 | 5/1974 | Petcher .................. 56/328.1 |
| 4,194,346 | 3/1980 | Ingalls ................... 56/DIG.8 |
| 4,884,392 | 12/1989 | Czajkowski et al. ....... 56/DIG.8 |
| 4,928,459 | 5/1990 | Thedford et al. .......... 56/13.3 |
| 5,134,837 | 8/1992 | Casey et al. ............. 56/DIG.8 |

Primary Examiner—George A. Suchfield
Attorney, Agent, or Firm—Steven G. Roeder

[57] ABSTRACT

A machine for harvesting foodstuffs, such as nuts from the ground, uses compressed air passing through at least one venturi to create a vacuum at the inlet of a pickup conduit. Nuts are sucked into the pickup conduit which provides a straight flow path for the nuts. Compressed air is also discharged near the pickup conduit inlet to blow nuts to the inlet of the pickup conduit. Additionally, the machine discharges air from laterally extending blower arms to move nuts from obstacles which cannot be easily reached by the pickup conduit to locations where the foodstuffs can be reached by the pickup conduit.

36 Claims, 4 Drawing Sheets

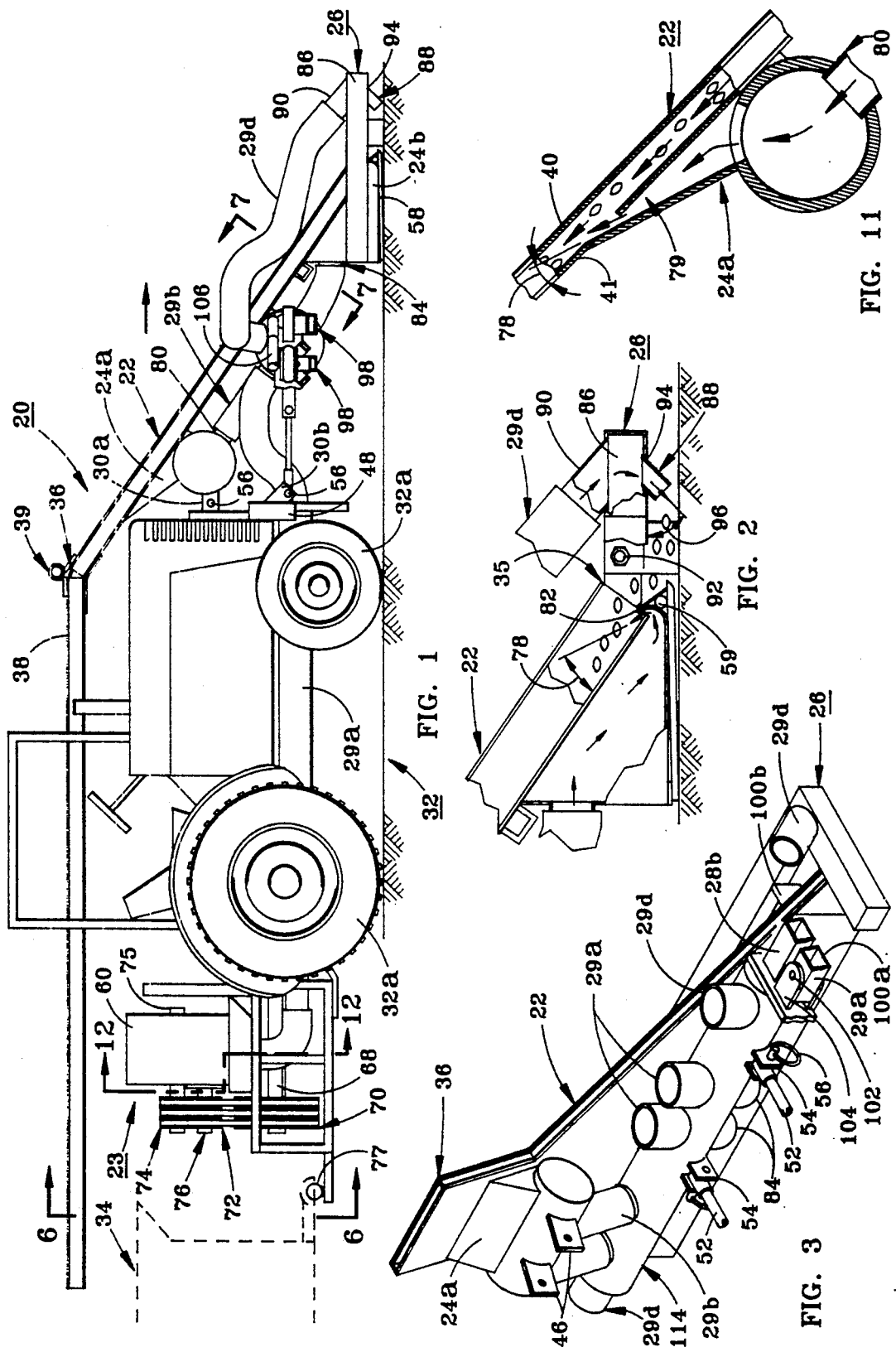

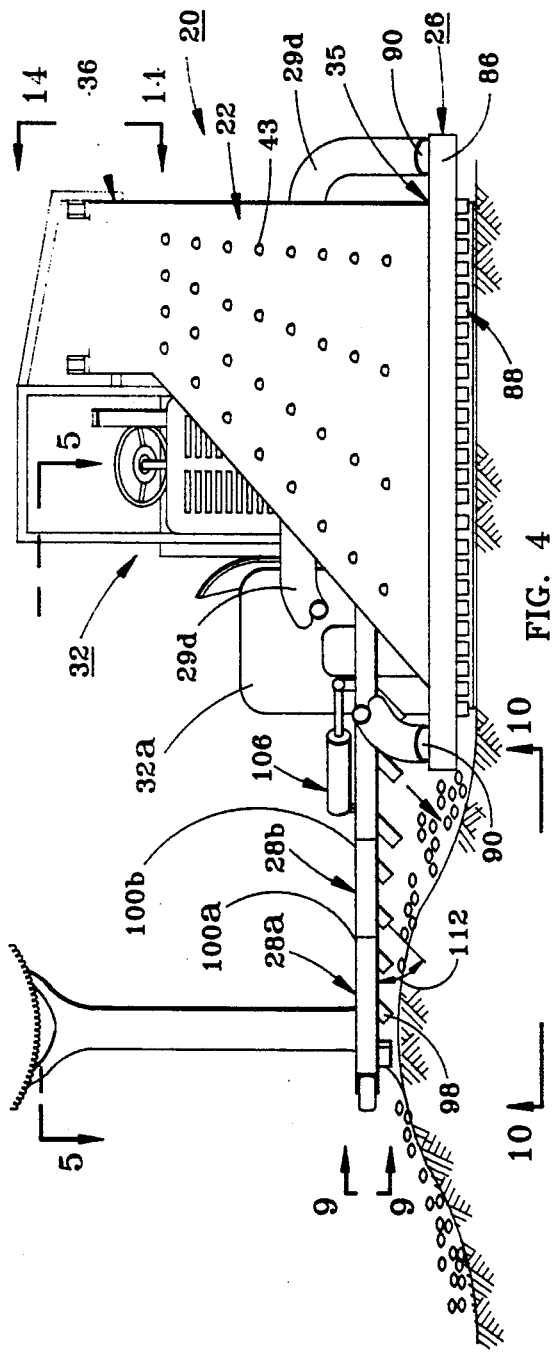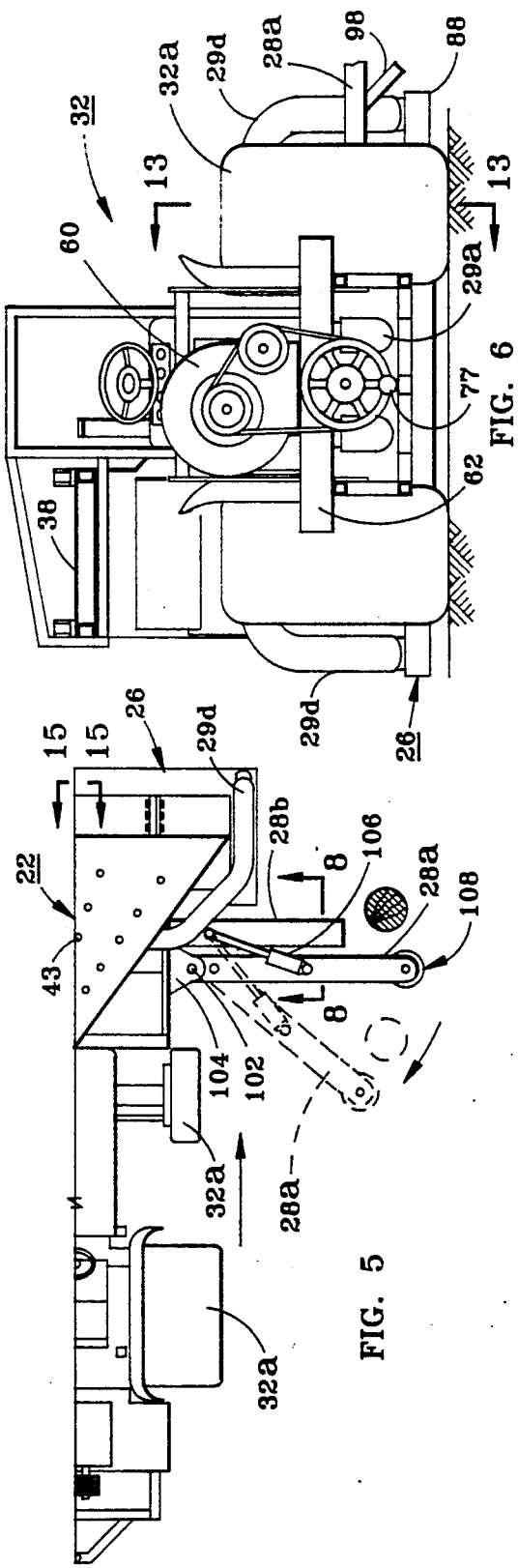

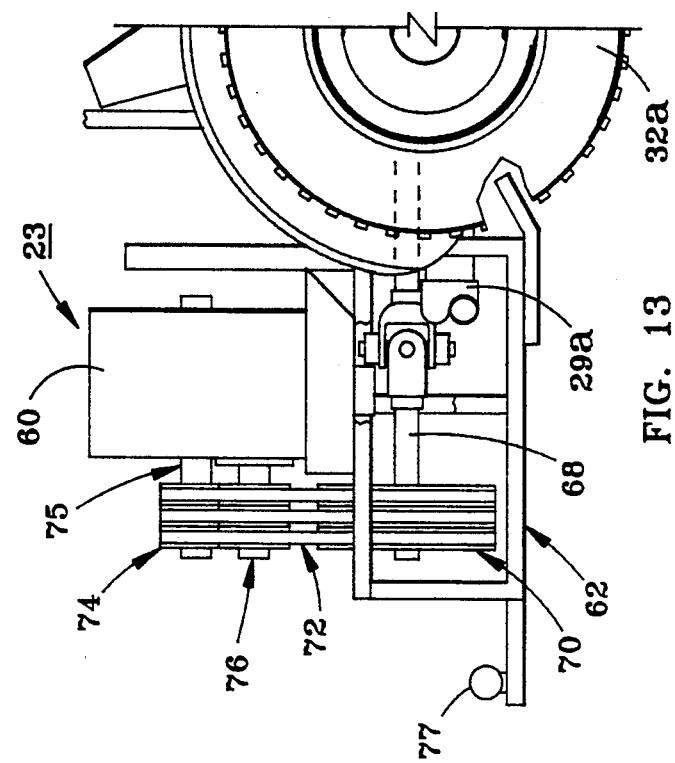
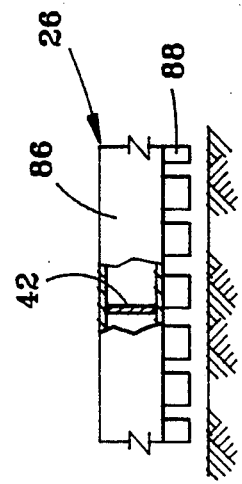
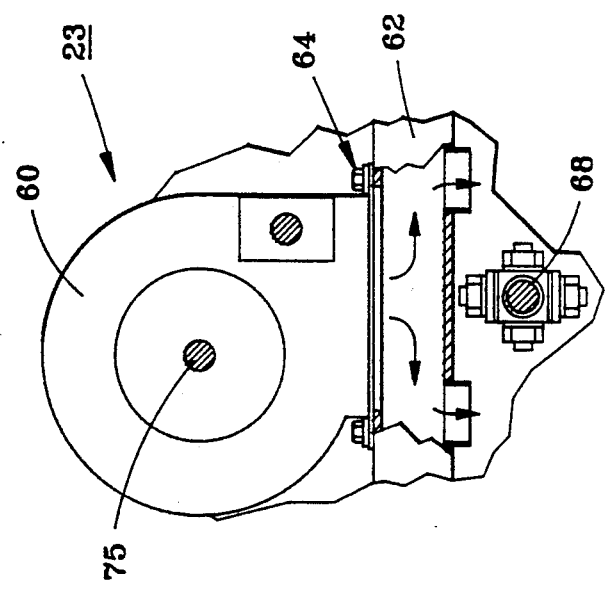

NUT HARVESTER

BACKGROUND

The present invention is directed to a machine for harvesting foodstuffs such as nuts from the ground.

Almonds, pecans, hazelnuts and other varieties of nuts grow on trees and bushes. When these nuts become ripe, many of them fall off the tree onto the ground. The nuts that are on the ground can be harvested in excellent condition.

With certain varieties of nuts, it is beneficial for the nuts to fall off the tree because it allows the nuts to dry before being harvested. Accordingly, it is common practice to shake the nut trees with a machine so that the nuts fall to the ground and dry. In these cases, the entire nut crop is harvested from the ground.

After the trees are shaken and the nuts have dried on the ground, a two-step process is used to harvest the nuts. First, a machine blows the nuts away from the base of the trees and off of the ridges on which these trees are planted. Usually this same machine also sweeps or blows the nuts into a long pile or row. A substantial portion of the nut crop can be lost during this step because the nuts are blown or swept into cracks in the ground, tire prints or footprints. A second machine then gathers the nuts from the pile or the row. Accordingly, the present harvesting process involves two separate machines making two or more separate passes through the nut orchard.

The present harvesting process has many disadvantages, which include being expensive and time-consuming. Additionally, while the nuts are on the ground, worms and other pests on the ground begin to eat at the nuts. After the nuts are swept into long piles, the worms and pests can move quickly from one nut to the next nut. A substantial portion of the nut crop can be damaged while the nuts are in the long piles. Moreover, when the nuts are being swept into long piles, the mechanical action of the sweeper can damage some of the nuts. Further, when the nuts are being swept or blown into the long piles, a great amount of dirt and debris from the ground is blown into the atmosphere, causing clouds of dirt which may cause environmental and health problems.

Accordingly, there is a need for a machine that quickly and efficiently harvests a nut crop from the ground in one pass through an orchard, thereby reducing the number of machines used in the harvest, eliminating the step of sweeping the nuts into long piles, reducing the amount of nuts lost in cracks in the ground, tire prints or footprints, reducing the amount of dust in the environment, and reducing the amount of nuts damaged or destroyed by worms, pests or mechanical handling.

SUMMARY

The present invention is directed to a machine that satisfies this need, the machine being useful for harvesting foodstuffs such as nuts from the ground.

A machine having features of the present invention comprises a pickup conduit, a compressed gas source, at least one venturi, and means for allowing the machine to be propelled through an orchard such as a tractor. The pickup conduit has an inlet for picking up foodstuffs directly from the ground and an outlet at a higher elevation than the inlet for discharging the foodstuffs into a receptacle. The pickup conduit provides a substantially straight passage for the foodstuffs so that the foodstuffs do not make any radical directional changes while traveling through the pickup conduit. The venturi has an inlet which is in fluid communication with the compressed gas source, and an outlet for discharging the compressed gas into the pickup conduit. The outlet of the venturi discharges the gas into the pickup conduit directed towards the pickup conduit outlet preferably at an acute angle in relation to the longitudinal axis of the pickup conduit. The venturi is capable of creating a vacuum at the inlet of the pickup conduit. The gas that is released from the venturi outlet into the pickup conduit is forced to make a change in direction while the air and the foodstuffs in the pickup conduit travel in a substantially straight path.

In one embodiment of the invention, the pickup conduit has means for controlling the distance between the pickup conduit inlet and the ground. The means for controlling distance between the pickup conduit inlet and the ground follows the contours of the ground and maintains a substantially constant distance between the pickup conduit inlet and the ground.

In a preferred embodiment, the outlet of the venturi releases the gas into the pickup conduit directed towards the pickup conduit outlet at an angle which is less than thirty degrees (30°) when measured in relation to the longitudinal axis of the pickup conduit. This allows for a smooth transition of flow for the foodstuffs in the pickup conduit.

The machine can have two or more venturis for discharging gas into the pickup conduit to create a vacuum at the pickup conduit inlet For example, the outlet of one of the venturis can discharge the compressed gas near the pickup conduit outlet, while the outlet of a second venturi discharges the compressed gas near the pickup conduit inlet. This embodiment is preferred since two venturis maintain a more even distribution of suction throughout the entire pickup conduit than one venturi.

In a typical embodiment of the invention, the means for propelling the machine through an orchard is a means for attaching the machine to a tractor. In another embodiment of the invention, the machine is self-propelled.

Preferably the machine includes at least one blower arm. The blower arm extends away from the pickup conduit laterally and generally parallel to the level portion of the ground. The inlet of the blower arm is in fluid communication with the compressed gas source. The blower arm has means for releasing a gas in a direction traverse to the ground such as a plurality of gas-discharging outlets. The released gas moves foodstuffs located on or near obstacles to where the foodstuffs can be easily harvested by the pickup conduit. In most cases, these obstacles are trees and the ridges on which these trees are planted. In this embodiment, the foodstuffs can be harvested from the ground and simultaneously blown from obstacles all in one trip through the orchard.

In a preferred embodiment, the blower arm comprises means for pivoting the arm away from solid obstacles, such as trees when the arm contacts such obstacles. This version is preferred since the blower arm can be used in close proximity to solid obstacles, such as trees to move foodstuffs from these solid obstacles.

Preferably, the machine has two blower arms which extend away from the pickup conduit laterally and generally parallel to the level ground, the first blower arm being a pivoting arm that extends farther laterally away from the pickup conduit than the second blower arm.

Preferably, the machine can have ground level blowing means for moving foodstuffs on the ground towards the pickup conduit inlet. The ground level blowing means can be a plurality of nozzles in fluid communication with the compressed gas source. These nozzles release gas towards the ground for moving foodstuffs on the ground towards the pickup conduit inlet.

The present invention provides a quick and efficient way to harvest foodstuffs from the ground. The machine allows foodstuffs to be harvested in one pass through the orchard, thereby reducing the number of different machines used in the harvest and eliminating the step of sweeping or blowing the foodstuffs into long piles or rows. Accordingly, since the foodstuffs are no longer swept or blown into long piles or rows, the amount of foodstuffs lost or destroyed and the amount of dust blown into the atmosphere are reduced.

DRAWINGS

These and other features of the present invention will become better understood with reference to the following description, appended claims, and accompanying drawings where:

FIG. 1 is a side elevation view of a nut harvesting machine embodying features of the present invention, the machine being attached to a tractor;

FIG. 2 is a side view partially broken away of a portion of the machine of FIG. 1;

FIG. 3 is a perspective rear view of a portion of the machine of FIG. 1;

FIG. 4 is a front elevation view of the machine of FIG. 1;

FIG. 5 is a top elevation view of the machine of FIG. 1 taken on line 5—5 in FIG. 4;

FIG. 6 is a rear elevation view of the machine shown in FIG. 1 taken on line 6—6 in FIG. 1;

FIG. 11 is a side view in partial cross-section of the venturi and the outlet of the pickup conduit of the machine shown in FIG. 1 taken on line 11—11 in FIG. 4;

FIG. 12 is a rear view in partial cross-section of the fan of the machine in FIG. 1 taken on line 12—12 of FIG. 1;

FIG. 13 is a side view in partial section of a portion of the machine in FIG. 1 taken on line 13—13 of FIG. 6;

FIG. 14 is a side view in partial cross-section of the pickup conduit outlet of the machine in FIG. 1 taken on line 14—14 of FIG. 4; and FIG. 15 is a partially broken away front view in partial cross-section of the ground level blowing means of the machine in FIG. 1 taken on line 15—15 of FIG. 5.

DESCRIPTION

Figure 7:
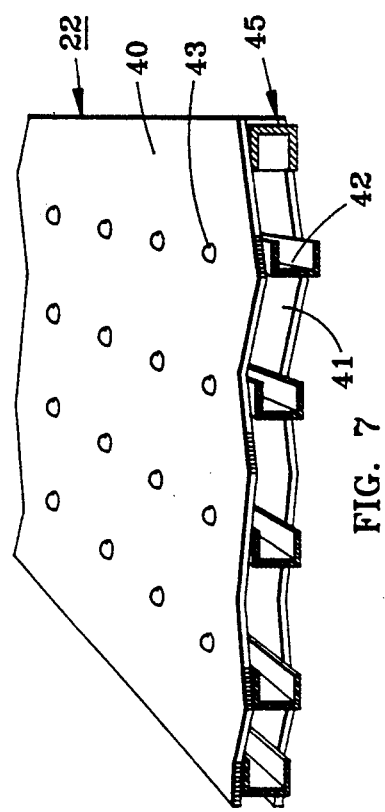
FIG. 7 is a perspective view in partial cross-section of the pickup conduit of the machine of FIG. 1 taken on line 7—7 in FIG. 1.

The present invention is for a machine 20 for harvesting foodstuffs from the ground. The machine 20 not only harvests foodstuffs from the ground, but also simultaneously moves the foodstuffs from obstacles to locations where the foodstuffs can be easily harvested by the machine 20.

The following discussion describes in detail one embodiment of the invention and several variations on that embodiment. This discussion should not be construed as limiting the invention to that particular embodiment or to those particular variations. Practitioners skilled in the art will recognize numerous other embodiments and variations as well. For a definition of the complete scope of the invention, the reader is directed to the appended claims.

Referring to the drawings, a nut harvester 20 according to the present invention comprises (a) a pickup conduit 22, (b) a compressed gas source 23, (c) an upper 24a and a lower 24b venturi, (d) ground level blowing means 26, (e) a pair of blower arms 28a and 28b, (f) connection conduits 29 for connecting the compressed gas source in fluid communication to the inlets of the venturis 24, the inlets of the ground level blowing means 26 and the inlets of the blower arms 28, and (g) mounts 30 for attaching the machine 20 to a tractor 32 for propelling the machine through the orchard.

Although the invention is described as a nut harvester 20, the invention can be used to harvest other foodstuffs from the ground, such as fruits and berries. Foodstuffs as used in this application can be any food substance that can be harvested from the ground. Accordingly, foodstuffs can be any variety of nut, berry, fruit or vegetable which is harvested from the ground.

The machine 20 releases compressed gas from the two venturis 24a and 24b. The released gas from the venturis 24a and 24b creates a vacuum in the pickup conduit 22. The vacuum created in the pickup conduit 22 lifts the foodstuffs directly from the ground and transports the foodstuffs to a receptacle 34. Compressed gas is also released from the ground level blowing means 26 and is directed towards the ground and the pickup conduit 22. The released gas assists the venturis 24a and 24b in lifting the foodstuffs from the ground. Additional compressed gas is released from the blower arms 28a and 28b which extend laterally from the edge of the pickup conduit 22. The released gas from the blower arms 28a and 28b moves foodstuffs from around obstacles to a location where the foodstuffs can be easily harvested by the pickup conduit 22. The present invention 2 is capable of simultaneously harvesting foodstuffs from the ground and moving foodstuffs from obstacles to a location where the foodstuffs can be easily harvested by the pickup conduit 22.

The pickup conduit 22 has an inlet 35 for picking up foodstuffs directly from the ground and an outlet 36 at a higher elevation for discharging the foodstuffs to a receptacle 34. The pickup conduit 22 can be any shape capable of moving the foodstuffs from the ground to a higher elevation in a substantially straight path. The shape of the pickup conduit inlet 35 can vary according to the shape which would best follow the surface to be harvested, while the shape of the pickup conduit outlet 36 can vary according to the shape which facilitates transporting the foodstuffs to the receptacle 34.

In most cases, the cross-sectional shape of the pickup conduit inlet 35 is rectangular with the cross-sectional width being much greater than the cross-sectional height. This shape is preferred since the inlet 35 can easily trace the contours of a flat surface such as the ground in a nut orchard. The cross-sectional height at the inlet 35 can be any height which allows the foodstuffs to flow freely into the pickup conduit 22 without causing excessive losses of vacuum. In preferred embodiments the cross-sectional height is between 1.5 inches and 2.5 inches. However, this height varies according to the size of the foodstuffs to be harvested. In the embodiment illustrated in the drawings, the cross-sectional height of pickup conduit 22 remains substantially constant from the inlet 35 to the outlet 36 because a decrease in height can restrict the flow of foodstuffs in the pickup conduit 22 while an increase in height may cause excessive losses of vacuum in the pickup conduit 22.

In the embodiment illustrated in the drawings, the cross-sectional width at the pickup conduit inlet 35 is substantially wider than the cross-sectional width at the pickup conduit outlet 36. The cross-sectional width of the pickup conduit inlet 35 varies according to the supply of compressed gas, the size of the venturis 24 and the spacing of the trees in the orchard. In the embodiment illustrated in FIG. 4, the cross-sectional width of the pickup conduit inlet 35 is about eight feet. This cross-sectional width is necessary in this embodiment so that the nuts are harvested along the entire front of the tractor 32. The foodstuffs must be harvested across the entire front of the tractor 32 otherwise the tractor wheels 32a would press the foodstuffs into the ground thereby causing the foodstuffs to be lost or damaged. Referring to FIG. 4, the cross-sectional width of the pickup conduit 22 decreases obliquely from the pickup conduit inlet 35 to the pickup conduit outlet 36. This shape is necessary in this embodiment to allow the pickup conduit 22 to be mounted on the front of the tractor 32, and the foodstuffs to be transported to a receptacle 34 while maintaining clear visibility for the driver of the tractor 32.

The pickup conduit outlet 36 can be any shape which does not disrupt or restrict the flow of the foodstuffs and the air in the pickup conduit 22. The pickup conduit outlet 36 must also facilitate the transition of the flow of the foodstuffs from the pickup conduit 22 to a receptacle 34 for the foodstuffs. In the embodiment illustrated in the drawings, the cross-section of the pickup conduit outlet 36 is rectangular to facilitate the use of a rectangular transporting duct 38 to the receptacle 34. The pickup conduit outlet 36 can be attached to rectangular transporting duct 38 by a hinge 39 which is welded to the pickup conduit outlet 36 and the rectangular transporting duct 38 or by other attaching means which allows the pickup conduit to rotate while the transporting duct 38 remains substantially stationery.

The cross-sectional height of the pickup conduit outlet 36 is about 2.5 inches and the width is about 24 inches. However, in many applications a circular cross-released section pickup conduit outlet 36 is preferred so that circular cross-sectioned ducting can be utilized.

The pickup conduit 22 can be made from any rigid material which does not collapse due to the vacuum created by the venturis 24 and which can withstand periodic contact with the ground. For most applications, a pickup conduit 22 made of a thin steel or aluminum is preferred. However, a hard, resilient plastic or other suitable material can also be used.

With reference to FIG. 7, the pickup conduit 22 has a top plate 40 and a bottom plate 41 which are made of 12 gauge mild steel. The top plate 40 and the bottom plate 41 are separated and supported by six, 12 gauge mild steel "C" channels 42. The top plate 40 and the bottom plate 41 are attached to the "C" channels 42 by bolts 43 or alternatively by other fastening means such as screws, welds 45 or adhesives. The "C" channels 42 are spaced evenly along the width of the pickup conduit 22 and extend the length of the pickup conduit 22. Because of the shape of the pickup conduit 22, the space between the "C" channels 42 is greater at the inlet 35 than at the outlet 36.

The pickup conduit 22 is the main structural element of the invention. The majority of the other elements are attached to the pickup conduit 22 as detailed below. The pickup conduit 22 is supported by the tractor 32 with the mounts upper 30a and lower 30b.

The upper mount 30a comprises of two upper flanges 46 which are welded perpendicular to the pickup conduit 22, a support bracket 48 which is mounted to the tractor 32 and a pair of fasteners, such as a bolts 56 or pins. The bolts 56 or pins connect the upper flanges 46 to the support bracket 48 and allow the pickup conduit 22 to rotate on the bolts 56 or pins. The lower mount 30b comprises of two hydraulic cylinders 52 which are attached to the support bracket 48 and four lower flanges 54 which are welded to the pickup conduit 22. The hydraulic cylinders 52 are attached to the lower flanges 54 and the support bracket 48 by fasteners, such as bolts or pins 56. The pickup conduit 22 rotates on the upper mount 30a. The hydraulic cylinders 52 can be used to control the height of the pickup conduit 22. With reference to FIG. 1, when the hydraulic cylinders 52 are extended the pickup conduit inlet 35 is raised from the ground to allow the machine 20 to be transported on the road.

In a preferred version of the invention, the pickup conduit 22 has means for controlling the distance between the pickup conduit inlet 35 and the ground. The pickup conduit inlet 35 must be maintained near the ground to ensure that the majority of foodstuffs is harvested from the ground. However, the pickup conduit inlet 35 should not be directly on the ground otherwise rocks and substantial amounts of dirt will also be vacuumed up by pickup conduit 22. Preferably, the pickup conduit inlet 35 is maintained between one-half inch and two inches above the ground. This distance allows rocks to pass under the inlet 35 and keeps the inlet 35 from digging into the ground.

With reference to FIGS. 1 and 2, the means for controlling the distance between the pickup conduit inlet and the ground can be a skid plate 58 mounted onto the bottom side of pickup conduit inlet 35. In this embodiment, the skid plate 58 is made from a one half inch thick mild steel plate. The surface area of the skid plate 58 which makes contact with the ground is sufficient to support the weight of the pickup conduit 22. The skid plate 58 is attached to the bottom of the lower venturi 24b by a weld 59, or alternatively by other fastening means such as bolts or screws. The skid plate 58 slides on the ground to maintain a substantially constant distance between the pickup conduit inlet 35 and the ground.

In another version of the invention, the means for controlling the distance between the pickup conduit inlet 35 and the ground can be a plurality of a guide wheels which are mounted near the pickup conduit inlet 35. In another embodiment, sensors can be used to monitor the ground height. These sensors can control the hydraulic cylinders 52 which adjust the height of the pickup conduit 22 to maintain the proper distance between the pickup conduit inlet 35 and the ground.

The compressed gas can be any gas which does not adversely affect the foodstuffs or damage the machine. In most cases, compressed atmospheric air is the preferred compressed gas, since it is inexpensive and abundant.

The compressed gas source 23 can be anything capable of supplying compressed gas in sufficient quantities to the venturis 24a and 24b. With reference to FIGS. 1, 6, 12 and 13, the compressed gas source is a close tolerance fan 60. This fan 60 is capable of 5400 cfm of flow at 2350 rpm. The fan 60 is attached to a fan cart 62 by bolts 64 or alternatively by screws or welds. The fan cart 62 is attached to a three point hitch of the tractor 32. The motor in the tractor 32 rotates a power take off (PTO) of the tractor 32. The tractor's 32 PTO rotates a drive shaft 68, which drives the fan 60 through a series of three lower pulleys 70, three belts 72, and three upper pulleys 74 and a fan drive shaft 75. A belt tensioner 76 is used to maintain the proper tension on the belts.

In many cases, more than one fan 60 can be used as the source of compressed gas. The size of the fans required or the number of fans required depends upon the size of the pickup conduit inlet 22, the venturis 24, the ground level blowing means 26 and the blower arms 28 used on the machine. Alternatively, the fan or fans may be rotated by the hydraulic pressure instead of being rotated by the tractor's 32 PTO.

In the embodiment illustrated in FIGS. 1, 6, and 13, a ball hitch 77 is attached near the back of the fan cart 62. The ball hitch 77 is used to attach the receptacle 34 to the fan cart 62.

The venturi 24 can be any size or shape capable of receiving compressed gas at the inlet of the venturi and discharging the gas into the pickup conduit 22, while creating a vacuum at the pickup conduit inlet 35. The outlet of the venturi 24 discharges the compressed gas into the pickup conduit 22 directed towards the pickup conduit outlet 36 at an acute angle 78 in relation to the longitudinal axis of the pickup conduit 22. The gas released from the venturi 24 is forced to change direction while the flow of air and foodstuffs travel in a substantially straight path in the pickup conduit 22. Preferably, the angle 78 is less than 30° to reduce turbulence and minimize damage to the foodstuffs by being slammed against the inside walls of the pickup conduit.

With reference to FIGS. 1, 2 and 11 the upper venturi 24a discharges the compressed gas in close proximity the pickup conduit outlet 36, while the lower venturi 24b discharges the compressed gas in close proximity to the pickup conduit 22. In this embodiment, both venturis 24 discharge the compressed gas into the pickup conduit inlet 35 at an angle 78 less than 30°.

With reference to FIG. 11, the upper venturi outlet 79 has a rectangular cross-section to fit the rectangular cross-section of the pickup conduit 22. The upper venturi outlet 79 extends the cross-sectional width of the pickup conduit 22 to ensure an even distribution of vacuum across the entire pickup conduit inlet 35. The cross-sectional height of the upper venturi outlet 79 is about 0.5 inches. The cross-sectional width of the upper venturi outlet 79 is about 2 feet. The height and width vary according to the supply of compressed gas and the cross-sectional width of the pickup conduit inlet 35.

The cross-section of the upper venturi inlet 80 is circular and about eight inches in diameter. The circular shape facilitates the use of circular ducts to connect the upper venturi 24a to the fan 60. The upper venturi inlet 80 is in fluid communication with the compressed gas supply 23 through connection conduits 29.

With reference to FIG. 2, the lower venturi outlet 82 also has a rectangular cross-section to fit the rectangular cross-section of the pickup conduit 22. The lower venturi outlet 82 also extends the cross-sectional width of the pickup conduit 22 to ensure an even distribution of vacuum across the entire pickup conduit inlet 35. The cross-sectional height of the lower venturi outlet 82 is about 0.3 inches. The cross-sectional width of the outlet 82 of the lower venturi 24b is about eight feet. The cross-section of the lower venturi inlet 84 is circular to facilitate the use of circular conduits to connect the lower venturi inlet 84 to the compressed gas source 23.

In the illustrated embodiment, the ground level blowing means 26 for moving foodstuffs on the ground towards the pickup conduit inlet 35 comprises a blowing means conduit 86 disposed near the pickup conduit inlet 35. The blowing means conduit 86 has a plurality of nozzles 88 for releasing compressed gas towards the ground and the pickup conduit inlet 35. The blowing means conduit 86 is in fluid communication with the compressed gas source. The blowing means conduit 86 can be any size or shape capable of receiving compressed gas at the blowing means conduit inlets 90 and distributing the gas to the nozzles 88 along the entire longitudinal width of the pickup conduit inlet 35. In the illustrated embodiment, the blowing means conduit 86 is a rectangular cross-sectioned tube which is about 2 inches in height and about four inches in width. The blowing means conduit 86 extends the width of the pickup conduit inlet 35 and is about eight feet long.

The blowing means conduit 86 can be made of a rigid material such as steel, aluminum or a hard plastic. In the illustrated embodiment, the blowing means conduit 86 is made from 12-gauge steel. However, a flexible blowing means conduit 86 such as plastic tubing or rubber hose can also be used to distribute the compressed gas to the nozzles 88 along the blowing means conduit 86. The blowing means conduit 86 is attached to the pickup conduit 22 near the inlet 35 by bolts 92 or alternatively by other fastening means, such as screws or welds.

The nozzles 88 can be any shape capable of releasing compressed gas from the conduit 86 towards the ground and the pickup conduit inlet 35. As shown in FIGS. 1, 2, 4 and 15, the nozzles 88 are one-inch tubes which are welded 94 into the conduit 86. These tubes are also made from 12-gauge steel. In other versions, the nozzles 88 can be made of aluminum, plastic, rubber, or other materials which can be fastened to the conduit 86. The cross-sectional size and shape of the nozzles 88 vary according to the source of compressed gas and the longitudinal width of the pickup conduit inlet 35. The nozzles 88 must have a sufficiently large cross-sectional area to release sufficient gas to move the foodstuffs on the ground towards the pickup conduit inlet 35, but small enough cross-sectional area to ensure that the gas is released evenly across the pickup conduit inlet 35.

Referring to FIG. 4, the nozzles 88 are spaced about (2) two inches apart across the entire width of the conduit. In the embodiment illustrated in the drawings, the nozzles 88 are directed at a forty-five degree angle 96 towards the ground and the pickup conduit inlet 35. In other embodiments, the angle 96 in which the nozzles 88 are directed towards the ground can be between twenty and sixty degrees. The spaces between the nozzles 88 varies according to the size and shapes of the nozzles 88.

The blower arms 28a and 28b extend laterally and generally parallel to the level portion of the ground from the edge of the pickup conduit 22. The inlet of blower arm 28 are connected to the compressed gas source 23 with connection conduits 29. These connection conduits 29 can be any shape or size capable of transporting the compressed gas to the blower arms 28a and 28b.

The blower arms 28a and 28b release compressed gas from a plurality of blower arm discharging outlets 98 in a direction transverse to the ground. The released gas moves foodstuffs from obstacles to where the foodstuffs can be easily harvested by the pickup conduit 22. In most situations, the obstacles are the ridges on which the trees are planted and the trees themselves. With reference to FIG. 4, the blower arms 28a and 28b extend parallel about one and a half feet above the level portion of the ground. The blower arms 28a and 28b are positioned to hover above the ridges on which the trees to be harvested are planted.

Each of the blower arms 28a and 28b comprises a blower arm conduit 100 and blower arm discharging outlets 98. The blower arm conduits 100 can be any shape capable of extending laterally beyond the edge of the pickup conduit inlet 35. The blower arm conduits 100 must be able to transport the compressed gas to the blower arm discharging outlets 98. The cross-section of the blower arm conduits 100 can be rectangular, circular or any other shape capable of transporting the compressed gas. In the version shown in FIGS. 4 and 10, the blower arm conduits 100a and 100b, are about three inches by five inches.

The blower arm conduits 100 must be rigid to extend laterally beyond the edge of the pickup conduit inlet 35. The blower arm conduits 100 can be made any suitable material, such as steel, aluminum, or a hard plastic. The blower arm conduits 100 material must also be strong enough to withstand occasional contact with an obstacle without damaging the conduits 100. Mild steel is the preferred material for the blower arm conduits 100.

Preferably, at least one of the blower arms 28a has means for pivoting away from solid obstacles, such as trees when the arm contact such obstacles. The pivoting feature allows the long blower arm 28a to extend between trees and then pivot around the trees. This allows nuts between the trees to be blown into position to be sucked up by the machine 20.

Referring to FIG. 5, the means for pivoting can be a bolt, pin 102 or anything capable of pivoting the blower arm 28 away from the solid obstacle. The pin 102 is connected to a flange 104 which is attached by a weld to the pickup conduit 22 and to the blower arm conduit 100a through a hole in the blower arm conduit 100a. The blower arm 28a is repositioned after impact by a return cylinder 106 or a spring which is attached to the pivoting blower arm conduit 28a and the pickup conduit 22, or alternatively to the solid blower arm conduit 28b. The pivoting blower arm 28a can have a roller wheel 108 on the end of the pivoting blower arm 28a to protect the obstacles in which the blower arm 28a makes contact. The roller wheel 108 is fastened to the blower arm 28a with a bolt 110 or alternatively by a pin or other fastening device. The wheel 108 rotates to protect the bark on the tree when the blower arm contacts a tree.

Any number of blower arms 28 can be used to move the foodstuffs from these obstacles. In the embodiment shown in the drawings, the first 28a and second blower arm 28b extend laterally away from the pickup conduit to blow foodstuffs off the ridge. The first blower arm 28a extends farther laterally from the pickup conduit than the second blower arm 28b to move foodstuffs from obstacles farther from the pickup conduit 22. The first blower arm 28a pivots while the second blower arm 28b does not pivot. The first blower arm 28a extends laterally about four and a half feet from the edge of the pickup conduit inlet 35 while the second blower arm extends only about two and one half feet laterally from the edge of the pickup conduit inlet 35. In this embodiment, the first blower arm 28a has means for pivoting while the second blower arm 28b is stationary. The second blower arm 28b which does not pivot is welded or alternately bolted to the pickup conduit.

Figure 10:
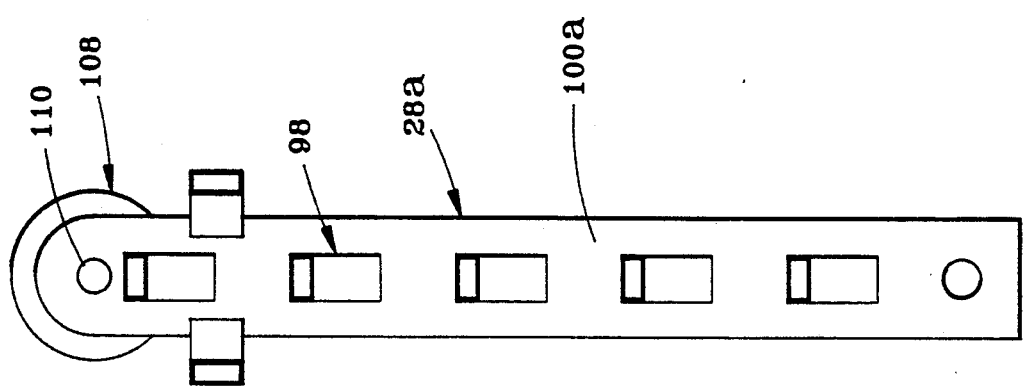
FIG. 10 is a bottom plan view of the pivoting blower arm of the machine of FIG. 1 taken on line 10—10 of FIG. 4.
Figure 8:
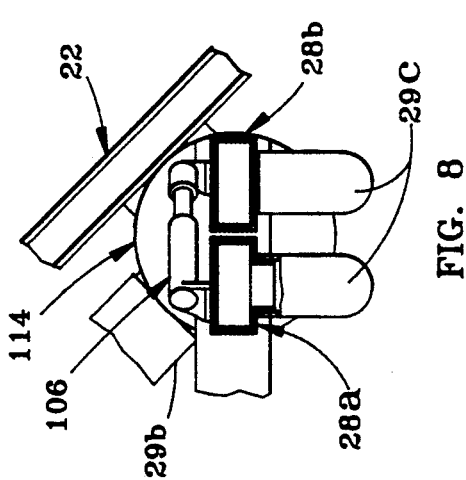
FIG. 8 is a side view in partial cross-section of the manifold and sections of tubing which connect to the venturi and the blowing arms of the machine of FIG. 1 taken on line 8—8 in FIG. 5.
Figure 9:
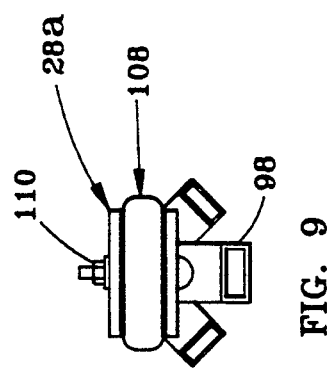
FIG. 9 is a side elevation view of the pivoting blowing arm of the machine of FIG. 1 taken on line 9—9 in FIG. 4.

The blower arm discharging outlets 98 can be any size or shape capable of releasing sufficient quantities of compressed gas to move foodstuffs away from the obstacles to a location where the foodstuffs can be easily harvested by the pickup conduit. The discharging outlets 98 can be any shape capable of directing the released gas traverse to the ground. Referring to FIGS. 4 and 10, the discharging outlets 98 are one by three-inch rectangular tubes which direct the discharging gas at about thirty degree angles 112 measured from the blower arms 28 in a direction traverse to the ground away from the machine 20. These discharging outlets 98 are approximately three inches long and are welded to the blower arms 28.

As noted above, the compressed gas source 23 can be multiple fans 60 blowing atmospheric air in fan 60 for the venturis 24a and 24b, a second fan (not shown) for the ground level blowing means 26 and a third fan (not shown) for the blower arms 28a and 28b. In the illustrated embodiment, the source of compressed air is one fan 60 and a manifold 114 is used to distribute the compressed air to the venturis 24a and 24b, the ground level blowing means 26, and the blower arms 28a and 28b. In another embodiment of the invention, multiple fans are used in conjunction with a manifold 114 to distribute the compressed air to the venturis 24a and 24b, the ground level blowing means 26, and the blower arms 28a and 28b.

The manifold 114 can be any size or shape as long as it is capable of properly distributing the compressed gas between the venturis 24a and 24b, the ground level blowing means 26, and the blower arms 28a and 28b. The manifold 114 is sized and shaped so that the venturis 24a and 24b, the ground level blowing means 26, and the blower arms 28a and 28b receive sufficient compressed gas to function properly. Accordingly, the size and shape of the manifold 114 varies according to the size and shape of the pickup conduit 22, the venturis 24a and 24b, the ground level blowing means 26, the blower arms 28a and 28b and compressed gas source 23. In the illustrated embodiment, the manifold 114 is a 10-inch diameter mild steel circular duct which is about five feet long. Preferably, the manifold 114 comprises means for selectively restricting the flow of air to the outlets of the manifold 114 so that the flow of compressed gas can be adjusted to ensure the proper flow to the venturis 24a and 24b, the ground level blowing means 26 and the blower arms 28.

The connection conduits 29 can be anything capable of connecting the compressed gas source in fluid communication to the venturis 24a and 24b, the ground level blowing means 26 and the blower arms 28a and 28b. The connection conduits 29 can be a conduit made from any suitable material, such as rubber, plastic or steel. In the illustrated embodiments, the connection conduits 29 between the fan and the manifold 114 are two 8-inch in diameter flexible plastic ducts 29a. These flexible ducts 29a allow for movement between the fan 60 and the manifold 114 which moves when the pickup conduit 22 is lifted by the hydraulic cylinders 52 or the means for controlling the distance between the pickup conduit inlet 35 and the ground. The outlets of the manifold 114 are connected to the venturis 24a and 24b with four, rigid six-inch diameter steel tubes 29b which are welded to the manifold 114 and the inlets of the venturis 24a and 24a. Rigid tubes 29b are used because the distance between manifold 114 and venturis 24a and 24b is fixed and the steel is durable. The manifold 114 is connected to the blower arms 28a and 28b with two, six (6)-inch diameter flexible tubing 29c which allow the arms to pivot. The manifold 114 is connected to the ground level blowing means 26 by two, six-inch diameter tubes 29d.

The tractor 32 propels the machine 20 through the orchard. The pickup conduit 22 is attached to a tractor 32 with the mounts 30. Hydraulic cylinders 52 are used to raise and lower the pickup conduit 22. The tractor 32 has hydraulic pumps to provide pressurized hydraulic oil to the cylinders 52. The tractor 32 has sufficient horsepower to rotate the fan 60, supply pressurized oil to the hydraulic cylinders 52 and move the machine 20 through the orchard.

In another embodiment of the invention, the machine 20 is self-propelled. In this embodiment, the machine 20 has wheels and a motor which propel the machine 20 through the orchard.

The machine 20 has many advantages. It eliminates the need to blow or sweep the foodstuffs into a long pile or row. It quickly and efficiently harvests foodstuffs from the ground in one pass through an orchard. The machine 20 reduces the amount of foodstuffs lost in cracks in the ground, tire prints or footprints, reduces the amount of foodstuffs destroyed or damaged by worms, pests or mechanical handling, reduces the amount of dust and debris in the atmosphere, and reduces the number of different machines used in the harvest.

Although the present invention has been described in considerable detail with reference to certain preferred versions, many other versions should be apparent to those skilled in the art. For example, a compressor can be used as the compressed gas source 23 rather than the fan 60. Therefore, the spirit and scope of the appended claims should not necessarily be limited to the description of the preferred versions contained herein.

What is claimed is:

1. A machine useful for harvesting foodstuffs such as nuts from the ground, comprising:
   (a) a pickup conduit having an inlet close to the ground for picking up foodstuffs directly from the ground, and an outlet for discharging the foodstuffs to a receptacle, the pickup conduit being open to the atmosphere only at the inlet and the outlet, the conduit being substantially straight between the inlet and the outlet to prevent blockage of the conduit by foodstuffs and debris;
   (b) a gas source;
   (c) at least one venturi having (i) an inlet in fluid communication with the gas source, and (ii) an inlet for discharging the gas towards the pickup conduit outlet, the venturi being capable of discharging gas from the gas source into the pickup conduit and creating a vacuum at the pickup conduit inlet sufficient to lift foodstuffs from the ground into the pickup conduit; and
   (d) means for propelling the machine.

2. The machine of claim 1 wherein the pickup conduit has means for controlling the distance between the pickup conduit inlet and the ground.

3. The machine of claim 1 wherein the outlet of the venturi discharges the compressed gas towards the pickup conduit outlet at an angle of less than 30° angle in relative to the longitudinal axis of the pickup conduit directed.

4. The machine of claim 1 comprising two such venturis wherein the outlet of a first one of the venturis is located proximate to the pickup conduit outlet, and the outlet of a second one of the venturis is located proximate to the pickup conduit inlet.

5. The machine of claim 4 comprising a blower arm extending away from the pickup conduit laterally and generally parallel to the ground, wherein the blower arm is in fluid communication with the gas source, the blower arm has means for releasing gas in a direction transverse to the ground for moving foodstuffs beyond the edge of the pickup conduit to where the foodstuffs can be harvested by the pickup conduit.

6. The machine of claim 5 wherein the blower arm comprises means for pivoting the arm away from obstacles.

7. The machine of claim 5 comprising two such blower arms wherein a first one of the blower arm extends farther away laterally from the pickup conduit than a second one of the blower arms, and at least the first blower arm comprises means for pivoting the first blower arm away from obstacles.

8. The machine of claim 1 or 7 comprising ground level blowing means for moving foodstuffs on the ground towards the pickup conduit inlet.

9. The machine of claim 8 wherein the ground level blowing means comprises a conduit located proximate to the pickup conduit inlet, the conduit having (i) an inlet which is in fluid communication with the gas source, and (ii) a plurality of nozzles for releasing gas towards the ground and toward the pickup conduit inlet.

10. The machine of claim 1 comprising a blower arm extending away from the pickup conduit laterally and generally parallel to the ground, wherein the blower arm is in fluid communication with the gas source, the blower arm has means for releasing gas in a direction transverse to the ground for moving foodstuffs beyond the edge of the pickup conduit to where the foodstuffs can be harvested by the pickup conduit.

11. The machine of claim 10 wherein the blower arm comprises means for pivoting the arm away from obstacles.

12. The machine of claim 10 comprising two such blower arms wherein a first one of the blower arm extends farther away laterally from the pickup conduit than a second one of the blower arms, and at least the first blower arm comprises means for pivoting the first blower arm away from obstacles.

13. A machine useful for harvesting foodstuffs such as nuts from the ground, comprising:
   (a) a pickup conduit having an inlet for picking up foodstuffs directly from the ground and an outlet for discharging the foodstuffs to a receptacle;
   (b) a gas source;
   (c) first and second venturis, each venturi having an inlet and an outlet wherein (i) the inlets of the two venturis are connected to the compressed gas source, (ii) the outlets of the two venturis discharge compressed gas towards the pickup conduit outlet, (iii) the outlet of the first venturi is proximate to the pickup conduit outlet, (iv) the outlet of the second venturi is proximate to the pickup conduit inlet, and (v) the venturis are capable of discharging the compressed gas from the compressed gas source into the conduit and creating a vacuum at the pickup conduit inlet; and
   (d) means for propelling the machine.

14. The machine of claim 13 comprising a blower arm extending away from the pickup conduit laterally and generally parallel to the ground, wherein the blower arm is in fluid communication with the gas source, the blower arm has means for releasing gas in a direction transverse to the ground for moving foodstuffs beyond the edge of the pickup conduit to where the foodstuffs can be harvested by the pickup conduit.

15. The machine of claim 14 wherein the blower arm comprises means for pivoting the arm away from obstacles.

16. The machine of claim 14 comprising two such blower arms wherein a first one of the blower arm extends farther away laterally from the pickup conduit than a second one of the blower arms, and at least the first blower arm comprises means for pivoting the first blower arm away from obstacles.

17. The machine of claim 13, 15, or 16 comprising ground level blowing means for moving foodstuffs on the ground towards the pickup conduit inlet.

18. A machine useful in harvesting foodstuffs from the ground comprising:
   (a) a pickup conduit having an inlet for picking up foodstuffs directly from the ground and an outlet for discharging the foodstuffs to a receptacle;
   (b) a source of gas;
   (c) at least one venturi capable of creating a vacuum at the inlet of the pickup conduit, the venturi inlet being connected to the source of gas and the venturi outlet being in the pickup conduit;
   (d) at least one blower arm extending laterally and generally parallel to the ground beyond the edge of the pickup conduit, wherein the blower arm is in fluid communication with the gas source, and the blower arm has means for releasing gas in a direction transverse to the ground for moving foodstuffs to where the foodstuffs can be harvested by the pickup conduit;
   (e) means for propelling the machine so that foodstuffs can be picked from the ground and simultaneously blown from obstacles.

19. The machine of claim 18 wherein the blower arm has means for pivoting the arm away from obstacles.

20. The machine of claim 18 comprising two such blower arms wherein a first one of the blower arm extends farther away laterally from the pickup conduit than a second one of the blower arms, and at least the first blower arm comprises means for pivoting the first blower arm away from obstacles.

21. The machine of claim 18 or 20 comprising ground level blowing means are for moving foodstuffs on the ground toward the pickup conduit inlet.

22. A machine useful for harvesting foodstuffs from the ground, comprising:
   (a) a pickup conduit having an inlet for picking up foodstuffs directly from the ground and an outlet for discharging the nuts to a receptacle, the conduit being substantially straight between the inlet and the outlet to prevent blockage of the conduit by foodstuffs and debris;
   (b) a gas source;
   (c) first and second venturis, each venturi having an inlet and an outlet, wherein (i) the inlet of each venturi is connected to the gas source, (ii) the outlet of each venturi can discharge gas towards the pickup conduit outlet, (iii) the outlet of the first venturi is located proximate to the pickup conduit outlet, (iv) the outlet of the second venturi is located proximate to the pickup conduit inlet, and (v) the venturis are capable of discharging the gas into the conduit to create a vacuum at the inlet of the pickup conduit;
   (d) ground level blowing means for moving foodstuffs on the ground towards the pickup conduit inlet;
   (e) at least one blower arm extending laterally and generally parallel to the ground from the edge of the pickup conduit, wherein (i) the blower arm is in fluid communication with the source of gas, (ii) the blower arm is capable of releasing gas in a direction transverse to the ground for moving foodstuffs to where they can be easily harvested by the pickup conduit, and (iii) the blower arm has means for pivoting the arm away from obstacles, such as trees when the arm contacts the obstacles;
   (f) connection means for connecting the source of gas to the inlets of the venturis, the ground level blowing means and the blower arm; and
   (g) means for propelling the machine so that foodstuffs can be harvested from the ground and simultaneously blown from obstacles.

23. The machine of claim 22 wherein the ground level blowing means comprises a conduit located proximate to the pickup conduit inlet, the conduit having (i) an inlet which is in fluid communication with the gas source, and (ii) a plurality of nozzles for releasing gas towards the ground and toward the pickup conduit inlet.

24. The machine of claim 22 comprising two such blower arms wherein a first one of the blower arm extends farther away laterally from the pickup conduit than a second one of the blower arms, and at least the first blower arm comprises means for pivoting the first blower arm away from obstacles.

25. A method for harvesting foodstuffs from the ground comprising the steps of:
   (a) propelling a pickup conduit along a path containing foodstuffs, the pickup conduit having an inlet and an outlet;
   (b) sucking foodstuffs in the path into the inlet of the pickup conduit;
   (c) passing the sucked-up foodstuffs through the pickup conduit to the outlet of the pickup conduit;
   (d) discharging the foodstuffs from the outlet of the pickup conduit into a receptacle; and
   (e) blowing foodstuffs in the path towards the inlet of the pickup conduit.

26. The method of claim 25 wherein the step of passing the sucked-up foodstuffs comprises passing the sucked-up foodstuffs along a substantially straight passage.

27. The method of claim 25 or 26 comprising the additional step of blowing foodstuffs that are not in the path of the pickup conduit into the path of the pickup conduit.

28. A machine for harvesting foodstuffs from the ground into a receptacle, the machine comprising:
   (a) a pickup conduit having an inlet and an outlet;
   (b) means for propelling the pickup conduit along a path containing foodstuffs;
   (c) means for sucking foodstuffs in the path into the inlet of the pickup conduit, passing the sucked-up foodstuffs through the pickup conduit to the outlet of the pickup conduit, and discharging the foodstuffs from the outlet of the pickup conduit into the receptacle; and
   (d) means for blowing foodstuffs in the path towards the pickup conduit.

29. The machine of claim 28 wherein the pickup conduit is substantially straight between the inlet and the outlet.

30. The machine of claim 28 or 29 including means for blowing foodstuffs that are not in the path of the pickup conduit into the path of the pickup conduit.

31. A machine useful for harvesting foodstuffs such as nuts from the ground, comprising:
   (a) a pickup conduit having an inlet for picking up foodstuffs directly from the ground and an outlet for discharging the foodstuffs to a receptacle;
   (b) a gas source;
   (c) at least one venturi having (i) an inlet in fluid communication with the gas source, and (ii) an outlet for discharging the gas towards the pickup conduit outlet, the venturi being capable of discharging gas from the gas source into the pickup conduit and creating a vacuum at the pickup conduit inlet;
   (d) ground level blowing means for moving foodstuffs on the ground towards the pickup conduit inlet; and
   (e) means for propelling the machine.

32. The machine of claim 31 wherein the ground level blowing means comprises a conduit located proximate to the pickup conduit inlet, the conduit having (i) an inlet which is in fluid communication with the gas source, and (ii) a plurality of nozzles for releasing gas towards the ground and toward the pickup conduit inlet.

33. The machine of claim 31 comprising two such venturis wherein the outlet of a first one of the venturis is located proximate to the pickup conduit outlet, and the outlet of a second one of the venturis is located proximate to the pickup conduit inlet.

34. The machine of claim 31 comprising a blower arm extending away from the pickup conduit laterally and generally parallel to the ground, wherein the blower arm is in fluid communication with the gas source, the blower arm has means for releasing gas in a direction transverse to the ground for moving foodstuffs beyond the edge of the pickup conduit to where the foodstuffs can be harvested by the pickup conduit.

35. The machine of claim 34 wherein the blower arm comprises means for pivoting the arm away from obstacles.

36. The machine of claim 34 comprising two such blower arms wherein a first one of the blower arm extends farther away laterally from the pickup conduit than a second one of the blower arms, and at least the first blower arm comprises means for pivoting the first blower arm away from obstacles.

* * * * *